A. F. CUSHMAN.
Drill-Chuck.

No. 218,861. Patented Aug. 26, 1879.

Witnesses:
Donn J. Twitchell.
D. P. Cowl

Inventor:
A. F. Cushman,
by his Atty's,
Dodge & Son

UNITED STATES PATENT OFFICE.

AUSTIN F. CUSHMAN, OF HARTFORD, CONNECTICUT.

IMPROVEMENT IN DRILL-CHUCKS.

Specification forming part of Letters Patent No. 218,861, dated August 26, 1879; application filed May 7, 1879.

*To all whom it may concern:*

Be it known that I, AUSTIN F. CUSHMAN, of Hartford, in the county of Hartford and State of Connecticut, have invented certain Improvements in Drill-Chucks, of which the following is a specification.

My invention relates to drill-chucks; and consists in an external sleeve or shell adapted to be drawn or forced against the outer faces of the sliding jaws after the latter are adjusted for the purpose of firmly supporting the jaws and relieving the adjusting devices of excessive strain.

Figure 1:
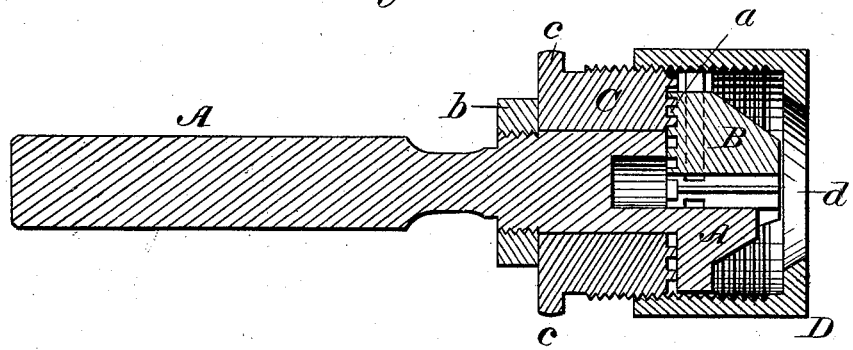
Figure 2:
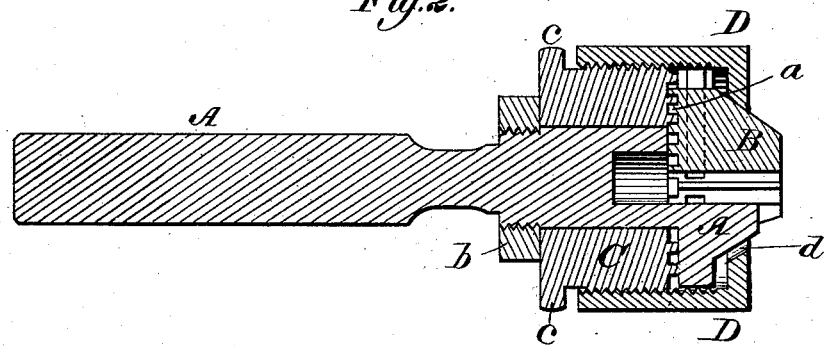

In the accompanying drawings, Figure 1 represents a longitudinal central section through my improved device with the cap or shell run partially off to permit the adjustment of the jaws, and Fig. 2 a similar view with the shell forced against the jaws and holding them in their adjusted position.

As commonly constructed, the scroll, or other device by which the sliding jaws of a chuck are operated, is made to serve also the purpose of sustaining the jaws in their adjusted position. This arrangement is objectionable for the reason that the scroll or other device, being subjected to the entire strain applied to the jaws, is rapidly worn and not unfrequently broken, in which latter case the chuck is rendered useless. The teeth of the jaws, when a scroll is employed, are likewise liable to be broken, and the jaws themselves occasionally work loose and release their hold upon the drill. These difficulties my invention is designed to obviate, and to this end the device is constructed as represented in the accompanying drawings, in which—

A represents the stock or body of the chuck, provided at its forward end with radial slots to receive the jaws B, as usual. In the drawings I have represented the chuck as furnished with a scroll or spiral screw to operate the jaws, said scroll being formed upon the face of an annular sleeve, C, encircling the body A, as shown, and engaging with teeth $a$, formed upon the rear or inner ends of the jaws B, as shown. The sleeve or scroll C is secured upon the body A by means of a nut, $b$, at its rear, as shown, or may be held in any other convenient manner. The sleeve or scroll C is furnished with an enlargement, $c$, which is milled or roughened to facilitate turning. By turning the sleeve C in one or the other direction the jaws are moved to or from the center, as desired.

D represents an external shell or cap, the forward end of which is formed with a circular opening, $d$, having beveled or inclined sides, as shown, adapted to fit closely against the rear sides of the jaws B, which are correspondingly beveled or inclined. The interior of the shell or cap D is threaded to adapt it to be screwed upon the exterior of the body A, as shown. When the jaws are in their adjusted positions the cap or shell is run or screwed onto the body until the inclined walls of the opening $d$ bear firmly against the rear faces of the jaws, as shown in Fig. 2. As the cap or shell is thus caused to bear upon the jaws, it serves not only to sustain the jaws firmly upon the drill or tool, but also to force them downward firmly to their seats or bearings in the head or stock, and thereby preclude the possibility of their working loose. When the jaws are to be moved back to release the tool or otherwise adjusted, the shell or cap D is first run partially off, in order to give room for their movement, the jaws then adjusted, and the cap again brought to bear upon them.

It will be observed that under the above contruction a firm support is given to the jaws in front of their guiding portions and at a point where they are of full thickness—in fact, to, or nearly to, their extreme forward ends—while the strain hitherto brought upon the adjusting devices is almost entirely relieved. The stock or body A is also carried forward to near the forward ends of the jaws, as shown, in order to give the jaws a firm side support, the forward portion being beveled off to correspond with the face of the jaws in their closed position.

While I have described the chuck as provided with a scroll for operating the jaws, it is obvious that other means may be employed for that purpose, the invention consisting, broadly, in the application of an external sustaining sleeve or shell independent of the operating devices.

I do not claim, broadly, the idea of an external ring or cone within which the jaws bear, as I am aware that many chucks have been made in which the jaws were arranged to slide in inclined bearings by means of an external cone forming a fixed part of the body of the chuck. In such case the cone receives the entire outward strain of the jaws, and instead of being a supplemental device to lock and hold the jaws after they have been adjusted, and to relieve the adjusting mechanism from strain, it is in itself a part of said mechanism. My device differs therefrom in that it is an attachment to an ordinary complete chuck; that it acts, not in the place of, but as an auxiliary to the jaw setting or adjusting mechanism; that by its use the jaws are given a double instead of a single support, and that its action is to force and hold the jaws back upon the scroll-thread, so that they may not ride therefrom or wear its edge out of form.

Having thus described my invention, what I claim is—

1. In a chuck, the combination of a body, radially-moving jaws having beveled outer faces, mechanism for adjusting the jaws radially and holding them in place, and a supplemental external shell or nut adapted to be set against and support the jaws after they have been adjusted by the other devices.

2. In a scroll-chuck, the combination of a body or shell, radially-moving jaws, a scroll-plate acting upon the rear sides of the jaws to adjust and hold the same, and a supplementary sleeve or nut, substantially as described, adapted to sustain and hold the jaws at their front sides after they have been adjusted, whereby the jaws are given a double support, or support on both sides.

3. The combination of the body provided with the sleeve having the spiral thread or scroll and with the external screw-thread, the radially-sliding jaws engaging with said scroll, and the outside sleeve or nut mounted upon the body and encircling the forward ends of the jaws, as shown, whereby the jaws are given additional support, the adjusting mechanism relieved from excessive strain, and the parts all bound firmly together.

4. In a chuck having radially-movable jaws, the combination of adjusting devices and an independent external supporting sleeve or shell, substantially as described.

AUSTIN F. CUSHMAN.

Witnesses:
GEORGE G. SILL,
LEWIS SPERRY.